(12) United States Patent
Mizuguchi

(10) Patent No.: US 12,719,922 B2
(45) Date of Patent: Aug. 25, 2026

(54) IMAGE PROCESSING APPARATUS AND MALWARE CHECKING METHOD

(71) Applicant: SHARP KABUSHIKI KAISHA, Sakai City (JP)

(72) Inventor: Yukinori Mizuguchi, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 265 days.

(21) Appl. No.: 18/395,883

(22) Filed: Dec. 26, 2023

(65) Prior Publication Data

US 2024/0236145 A1 Jul. 11, 2024

(30) Foreign Application Priority Data

Jan. 6, 2023 (JP) ................................ 2023-001154

(51) Int. Cl.
*H04L 9/40* (2022.01)
*G06F 21/56* (2013.01)

(52) U.S. Cl.
CPC .......... *H04L 63/145* (2013.01); *G06F 21/566* (2013.01)

(58) Field of Classification Search
None
See application file for complete search history.

(56) References Cited

U.S. PATENT DOCUMENTS

| | | | | |
|---|---|---|---|---|
| 8,291,496 | B2 * | 10/2012 | Bennett | H04L 63/1441 726/23 |
| 8,769,692 | B1 * | 7/2014 | Muttik | G06F 21/56 726/22 |
| 9,740,862 | B1 * | 8/2017 | Quinlan | G06F 21/53 |
| 10,382,479 | B2 * | 8/2019 | Adams | H04L 63/145 |
| 11,388,141 | B1 * | 7/2022 | Rupavatharam | H04L 63/0236 |
| 11,880,458 | B2 * | 1/2024 | Sathyanarayana | G06F 21/566 |
| 12,282,554 | B2 * | 4/2025 | Kim | G06F 21/565 |
| 2002/0112186 | A1 * | 8/2002 | Ford | H04L 63/105 726/7 |
| 2003/0009396 | A1 * | 1/2003 | DeVries | G06Q 30/06 705/28 |
| 2006/0230455 | A1 * | 10/2006 | Lo | G06F 21/78 726/24 |
| 2009/0044252 | A1 * | 2/2009 | Kashima | H04L 51/214 709/206 |
| 2010/0031353 | A1 * | 2/2010 | Thomas | G06F 21/563 718/1 |

(Continued)

FOREIGN PATENT DOCUMENTS

| | | | |
|---|---|---|---|
| JP | 2004259060 | * | 9/2004 |
| JP | 2018-073035 | A | 5/2018 |

*Primary Examiner* — Khang Do
(74) *Attorney, Agent, or Firm* — ScienBiziP, P.C.

(57) ABSTRACT

An image processing apparatus includes a data receiver which receives, from outside, data including user information and device information; a storage which stores the data; a malware checker which checks whether the received data includes malware; and a reception restrictor which restricts, on or after detection of the malware from the data by the checking, reception of at least specific data from the outside. The specific data is, if a user is specifiable based on the user information, data related to the user, and is, if a device which has provided the data is specifiable based on the device information, data provided from the device.

9 Claims, 10 Drawing Sheets

(56) References Cited

U.S. PATENT DOCUMENTS

| | | | | |
|---|---|---|---|---|
| 2011/0131650 | A1* | 6/2011 | de los Reyes | H04L 63/0209 726/25 |
| 2012/0162698 | A1* | 6/2012 | Pinney | G06F 21/52 358/1.15 |
| 2012/0307281 | A1* | 12/2012 | Sweet | G06F 3/1288 358/1.14 |
| 2014/0282877 | A1* | 9/2014 | Mahaffey | H04W 12/33 726/3 |
| 2015/0271177 | A1* | 9/2015 | Mun | H04L 63/0853 726/7 |
| 2016/0127396 | A1* | 5/2016 | Iwamura | H04L 63/145 726/22 |
| 2016/0285898 | A1* | 9/2016 | Ishii | H04L 63/1416 |
| 2017/0019418 | A1* | 1/2017 | Ikuse | H04L 63/1425 |
| 2017/0302682 | A1* | 10/2017 | Kokubo | G06F 21/567 |
| 2018/0121653 | A1* | 5/2018 | Akita | G06F 21/84 |
| 2019/0026465 | A1* | 1/2019 | Ardeli | H04L 63/0236 |
| 2020/0045058 | A1* | 2/2020 | Oe | H04L 63/1416 |
| 2020/0099631 | A1* | 3/2020 | Cheng | H04L 61/5007 |
| 2020/0192718 | A1* | 6/2020 | Jia | H04L 67/306 |
| 2021/0217025 | A1* | 7/2021 | Zhou | G06Q 20/32 |
| 2021/0271531 | A1* | 9/2021 | Paulsen | G06F 9/542 |
| 2023/0111344 | A1* | 4/2023 | Nakano | H04N 1/00209 358/1.15 |
| 2024/0048401 | A1* | 2/2024 | Takei | H04L 12/282 |
| 2024/0236145 | A1* | 7/2024 | Mizuguchi | H04L 63/145 |

* cited by examiner

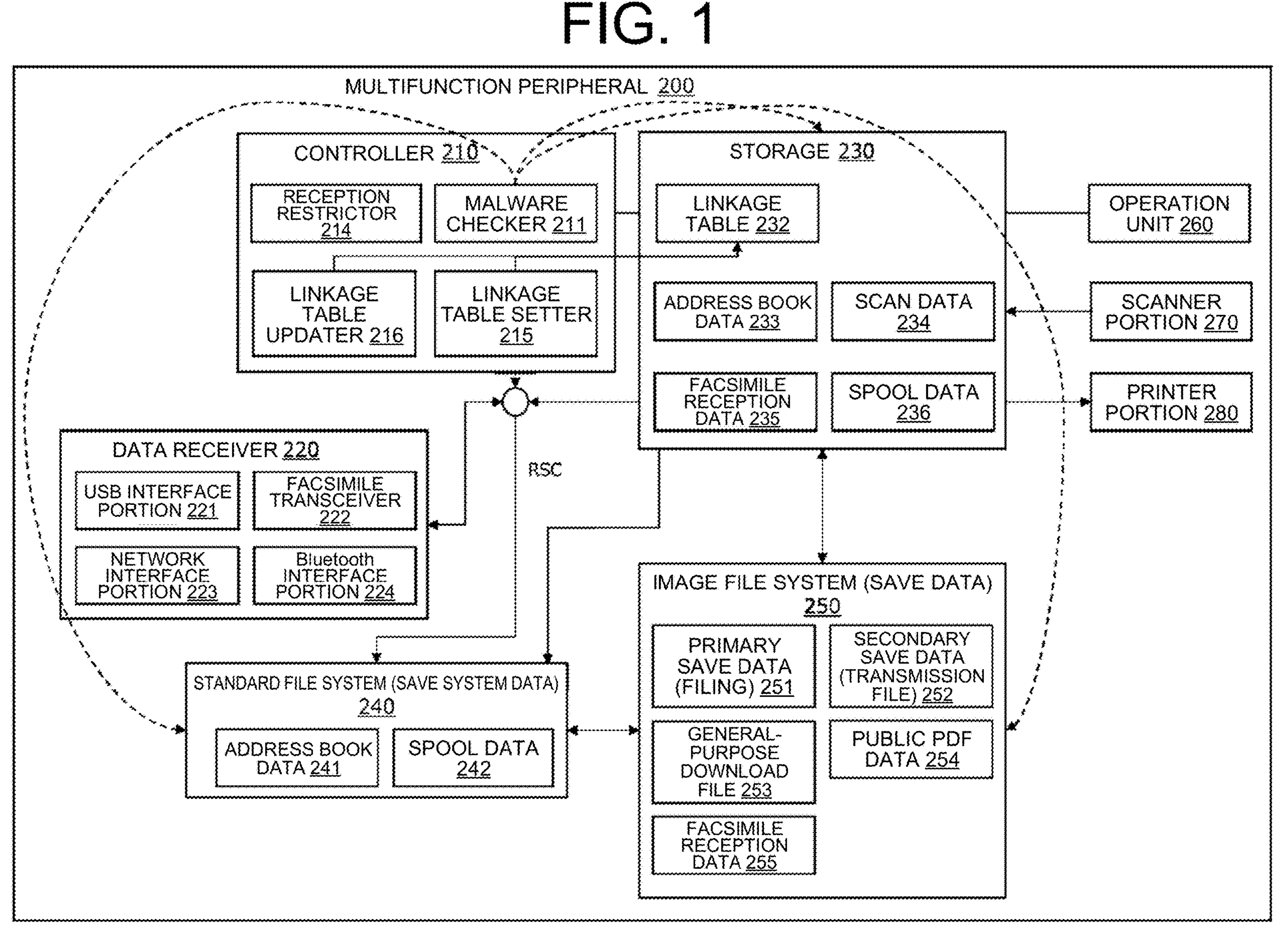
FIG. 1
MULTIFUNCTION PERIPHERAL 200
CONTROLLER 210
RECEPTION RESTRICTOR 214
MALWARE CHECKER 211
LINKAGE TABLE UPDATER 216
LINKAGE TABLE SETTER 215
STORAGE 230
LINKAGE TABLE 232
ADDRESS BOOK DATA 233
SCAN DATA 234
FACSIMILE RECEPTION DATA 235
SPOOL DATA 236
OPERATION UNIT 260
SCANNER PORTION 270
PRINTER PORTION 280
DATA RECEIVER 220
USB INTERFACE PORTION 221
FACSIMILE TRANSCEIVER 222
NETWORK INTERFACE PORTION 223
Bluetooth INTERFACE PORTION 224
RSC
STANDARD FILE SYSTEM (SAVE SYSTEM DATA) 240
ADDRESS BOOK DATA 241
SPOOL DATA 242
IMAGE FILE SYSTEM (SAVE DATA) 250
PRIMARY SAVE DATA (FILING) 251
SECONDARY SAVE DATA (TRANSMISSION FILE) 252
GENERAL-PURPOSE DOWNLOAD FILE 253
PUBLIC PDF DATA 254
FACSIMILE RECEPTION DATA 255

| USER | DEVICE |
|---|---|
| USER A | DEVICE 1, DEVICE 2 |
| USER B | DEVICE 1, DEVICE 3 |
| USER C | DEVICE 2 |
| USER D | DEVICE 3 |

FIG. 5

| ID | DEVICE SPECIFYING | USER SPECIFYING | TARGET AND CONTENTS OF RESTRICTION | |
|---|---|---|---|---|
| 1 | DEVICE INFORMATION (RECEIVED DATA) | USER INFORMATION (RECEIVED DATA) | SPECIFIC DEVICE | DATA RECEPTION (INCLUDING PRINT JOB) |
| 2 | | | SPECIFIC USER | ALL JOBS |
| 3 | DEVICE INFORMATION (RECEIVED DATA) | LINKAGE TABLE | SPECIFIC DEVICE | DATA RECEPTION (INCLUDING PRINT JOB) |
| 4 | | | USER LINKED TO SPECIFIC DEVICE (ESTIMATED USER) | ALL JOBS |
| 5 | LINKAGE TABLE | USER INFORMATION (RECEIVED DATA) | DEVICE LINKED TO SPECIFIC USER (ESTIMATED DEVICE) | DATA RECEPTION (INCLUDING PRINT JOB) |
| 6 | | | SPECIFIC USER | ALL JOBS |
| 7 | | | ESTIMATED USER LINKED TO ESTIMATED DEVICE (SECONDARY ESTIMATED USER) | PRINT JOB |

FIG. 6

EXAMPLE OF RECEPTION RESTRICTION OF CASE WHERE MALWARE WAS DETECTED AT THE TIME OF RECEIPT OF DATA THAT USER A TRANSMITTED FROM DEVICE 1

| ID | DEVICE SPECIFYING | USER SPECIFYING | DEVICE TO BE SET AS TARGET OF RESTRICTION | USER TO BE SET AS TARGET OF RESTRICTION (ALL JOBS RELATED TO SPECIFIC USER) |
|---|---|---|---|---|
| 1, 2 | DEVICE INFORMATION (RECEIVED DATA) | USER INFORMATION (RECEIVED DATA) | DEVICE 1 | USER A |
| 3, 4 | DEVICE INFORMATION (RECEIVED DATA) | LINKAGE TABLE | DEVICE 1 | USER A, USER B |
| 5-7 | LINKAGE TABLE | USER INFORMATION (RECEIVED DATA) | DEVICE 1, DEVICE 2 | USER A, USER B, AND USER C* *RESTRICTION ON USERS B AND C IS ONLY PRINT JOB |

70

REGISTRATION AND EDITING OF LINKAGE TABLE

| ID | USER | DEVICE |
|---|---|---|
| 1 | USER A | DEVICE 1, DEVICE 2 |
| 2 | USER B | DEVICE 1, DEVICE 3 |
| 3 | USER C | DEVICE 2 |
| 4 | USER D | DEVICE 3 |

CANCEL

REGISTER/ EDIT

| ID | DEVICE SPECIFYING | USER SPECIFYING | DEVICE TO BE SET AS TARGET OF RESTRICTION | RECEPTION RESTRICTION REMOVAL CONDITION |
|---|---|---|---|---|
| 1 | DEVICE INFORMATION (RECEIVED DATA) | USER INFORMATION (RECEIVED DATA) | SPECIFIC DEVICE | MALWARE DISINFECTION OF SPECIFIC DEVICE HAS BEEN CONFIRMED |
| 3 | DEVICE INFORMATION (RECEIVED DATA) | LINKAGE TABLE | SPECIFIC DEVICE | MALWARE DISINFECTION OF SPECIFIC DEVICE HAS BEEN CONFIRMED |
| 5 | LINKAGE TABLE | USER INFORMATION (RECEIVED DATA) | ESTIMATED DEVICE (DEEMED INFECTED DEVICE WHICH IS DEEMED TO BE INFECTED WITH MALWARE)* | MALWARE DISINFECTION OF DEEMED INFECTED DEVICE HAS BEEN CONFIRMED |
| | | | ESTIMATED DEVICE (DEEMED NON-INFECTED DEVICE WHICH IS DEEMED TO BE NON-INFECTED WITH MALWARE)* | IT HAS BEEN CONFIRMED THAT DEEMED NON-INFECTED DEVICE IS NOT DEEMED INFECTED DEVICE |

* DEVICE USED BY SPECIFIC USER AT THE TIME OF MALWARE DETECTION IS ASSUMED AS MALWARE-INFECTED DEVICE AND DEVICE NOT USED BY SPECIFIC USER AT THE TIME OF MALWARE DETECTION IS ASSUMED AS NON-INFECTED DEVICE
(IT IS POSSIBLE TO ASCERTAIN FROM WHICH DEVICE SPECIFIC USER WAS INFECTED)

FIG. 10

| ID | DEVICE SPECIFYING | USER SPECIFYING | USER TO BE SET AS TARGET OF RESTRICTION | RECEPTION RESTRICTION REMOVAL CONDITION |
|---|---|---|---|---|
| 2 | DEVICE INFORMATION (RECEIVED DATA) | USER INFORMATION (RECEIVED DATA) | SPECIFIC USER | MALWARE DISINFECTION OF DEVICE USED BY SPECIFIC USER HAS BEEN CONFIRMED |
| 4 | DEVICE INFORMATION (RECEIVED DATA) | LINKAGE TABLE | ESTIMATED USER (DEEMED INFECTED USER WHO HAS USED SPECIFIC DEVICE IN TARGET PERIOD*1) | MALWARE DISINFECTION OF DEVICE USED BY DEEMED INFECTED USER HAS BEEN CONFIRMED |
| | | | ESTIMATED USER (DEEMED NON-INFECTED USER WHO HAS NOT USED SPECIFIC DEVICE IN TARGET PERIOD*1) | IT HAS BEEN CONFIRMED THAT DEVICE IS USED ONLY BY DEEMED NON-INFECTED USER |
| 5 | LINKAGE TABLE | USER INFORMATION (RECEIVED DATA) | SPECIFIC USER | MALWARE DISINFECTION OF DEVICE USED BY SPECIFIC USER HAS BEEN CONFIRMED |
| 7 | | | SECONDARY ESTIMATED USER LINKED TO ESTIMATED DEVICE (USER LINKED TO DEEMED INFECTED DEVICE*2) | MALWARE DISINFECTION OF DEVICE USED BY SECONDARY ESTIMATED USER HAS BEEN CONFIRMED |
| | | | SECONDARY ESTIMATED USER LINKED TO ESTIMATED DEVICE (USER LINKED TO DEEMED NON-INFECTED DEVICE*2) | IT HAS BEEN CONFIRMED THAT USER IS NOT LINKED TO DEEMED INFECTED DEVICE |

*1 PERIOD FROM POINT OF TIME OF LATEST RECEIPT OF DATA IN WHICH NO MALWARE WAS DETECTED TO POINT OF TIME OF RECEIPT OF DATA IN WHICH MALWARE WAS DETECTED
*2 DEVICE USED BY SPECIFIC USER AT THE TIME OF MALWARE DETECTION CORRESPONDS TO DEEMED INFECTED DEVICE

FIG. 14

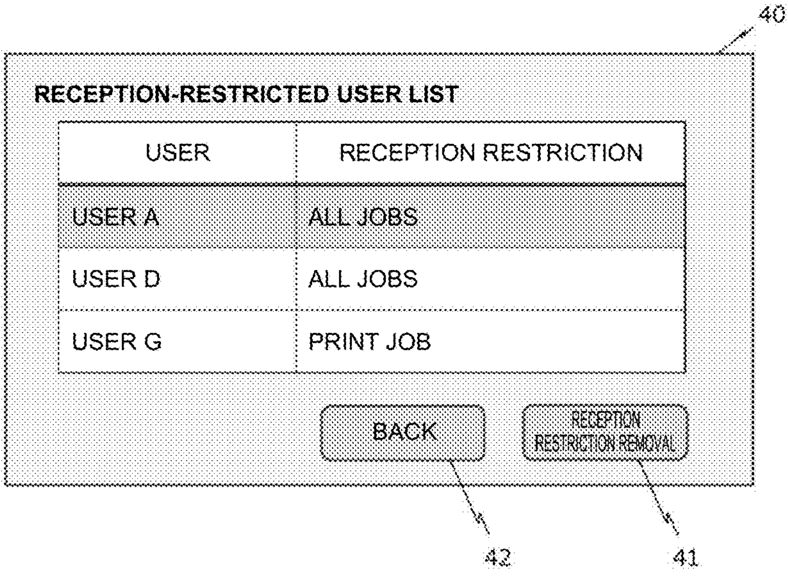

FIG. 15

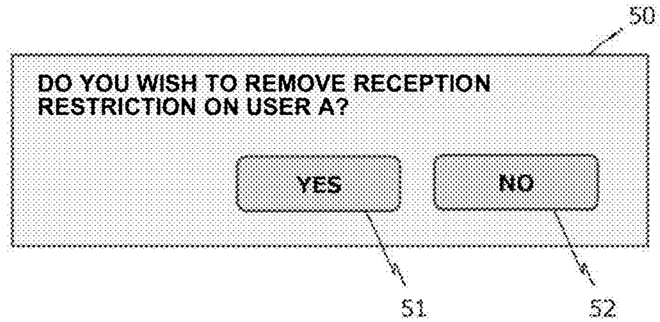

FIG. 16

MALWARE WAS DETECTED IN MFPxx ON MM/DD, HH:MM (DATE AND TIME).
FOR ENSURING SECURITY, RECEPTION RESTRICTION ON DEVICE AND USER IS BEING PERFORMED.
AFTER CONFIRMING MALWARE DISINFECTION, PLEASE REMOVE RECEPTION RESTRICTION.

MALWARE DETECTED DATA TRANSMISSION USER: USER A
DEVICE USED AT THE TIME OF MALWARE DETECTION: UNCERTAIN
DEVICE LINKED TO USER A: DEVICE 1 AND DEVICE 2
USER LINKED TO DEVICE 1: USER A AND USER B
USER LINKED TO DEVICE 2: USER A AND USER C

FIG. 17

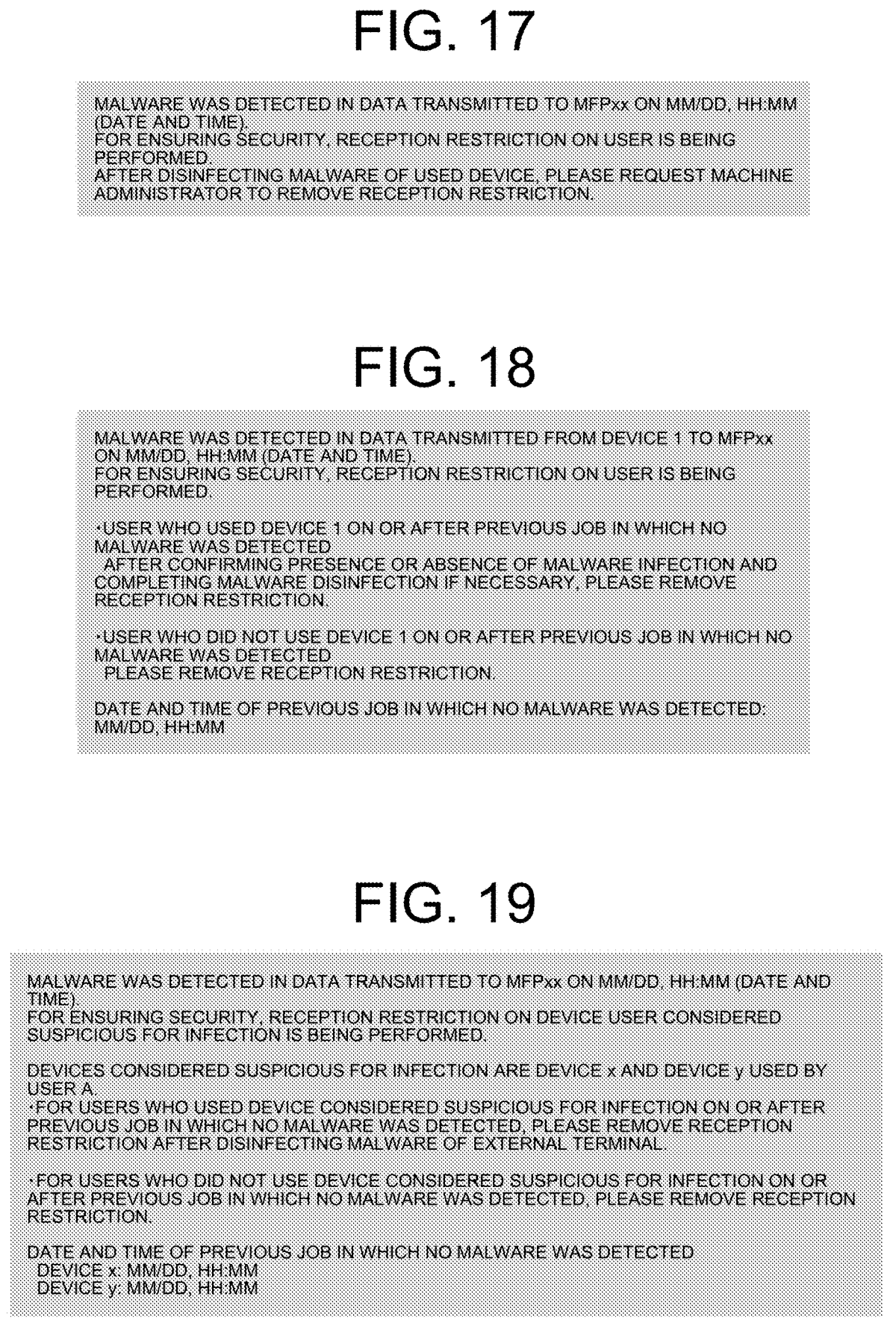

MALWARE WAS DETECTED IN DATA TRANSMITTED TO MFPxx ON MM/DD, HH:MM (DATE AND TIME).
FOR ENSURING SECURITY, RECEPTION RESTRICTION ON USER IS BEING PERFORMED.
AFTER DISINFECTING MALWARE OF USED DEVICE, PLEASE REQUEST MACHINE ADMINISTRATOR TO REMOVE RECEPTION RESTRICTION.

FIG. 18

MALWARE WAS DETECTED IN DATA TRANSMITTED FROM DEVICE 1 TO MFPxx ON MM/DD, HH:MM (DATE AND TIME).
FOR ENSURING SECURITY, RECEPTION RESTRICTION ON USER IS BEING PERFORMED.

·USER WHO USED DEVICE 1 ON OR AFTER PREVIOUS JOB IN WHICH NO MALWARE WAS DETECTED
AFTER CONFIRMING PRESENCE OR ABSENCE OF MALWARE INFECTION AND COMPLETING MALWARE DISINFECTION IF NECESSARY, PLEASE REMOVE RECEPTION RESTRICTION.

·USER WHO DID NOT USE DEVICE 1 ON OR AFTER PREVIOUS JOB IN WHICH NO MALWARE WAS DETECTED
PLEASE REMOVE RECEPTION RESTRICTION.

DATE AND TIME OF PREVIOUS JOB IN WHICH NO MALWARE WAS DETECTED: MM/DD, HH:MM

FIG. 19

MALWARE WAS DETECTED IN DATA TRANSMITTED TO MFPxx ON MM/DD, HH:MM (DATE AND TIME).
FOR ENSURING SECURITY, RECEPTION RESTRICTION ON DEVICE USER CONSIDERED SUSPICIOUS FOR INFECTION IS BEING PERFORMED.

DEVICES CONSIDERED SUSPICIOUS FOR INFECTION ARE DEVICE x AND DEVICE y USED BY USER A.
·FOR USERS WHO USED DEVICE CONSIDERED SUSPICIOUS FOR INFECTION ON OR AFTER PREVIOUS JOB IN WHICH NO MALWARE WAS DETECTED, PLEASE REMOVE RECEPTION RESTRICTION AFTER DISINFECTING MALWARE OF EXTERNAL TERMINAL.

·FOR USERS WHO DID NOT USE DEVICE CONSIDERED SUSPICIOUS FOR INFECTION ON OR AFTER PREVIOUS JOB IN WHICH NO MALWARE WAS DETECTED, PLEASE REMOVE RECEPTION RESTRICTION.

DATE AND TIME OF PREVIOUS JOB IN WHICH NO MALWARE WAS DETECTED
DEVICE x: MM/DD, HH:MM
DEVICE y: MM/DD, HH:MM

IMAGE PROCESSING APPARATUS AND MALWARE CHECKING METHOD

CROSS-REFERENCE TO RELATED APPLICATION

The present application claims priority from Japanese Application JP2023-001154, the content of which is hereby incorporated by reference into this application.

BACKGROUND OF THE INVENTION

1. Field of the Invention

The present disclosure relates to an image processing apparatus having the function of checking whether data received from the outside includes malware, and a malware checking method.

2. Description of the Related Art

In a conventional technology, as one type of information processing apparatus, an image processing apparatus which executes virus detection processing, which is the processing of detecting a computer virus, is known. In the conventional technology, it has been proposed that, when a computer virus is detected in one information processing apparatus, which is an information processing apparatus among a plurality of information processing apparatuses, the information processing apparatus sends a request to the other information processing apparatuses to execute virus detection processing, thereby suppressing the spread of infection of the computer virus. The above has been proposed since data exchange may be carried out frequently between the information processing apparatuses, and thus, if one information processing apparatus is infected with a computer virus, the other information processing apparatuses may also become infected with the computer virus due to communication and the like with the infected information processing apparatus.

SUMMARY OF THE INVENTION

When transmission and reception of data is conducted between devices, data including malware, such as a computer virus, may be transmitted to other devices as described in the conventional technology. There is a fear that the data including malware may be spread by the transmission and reception of data, and infection with the malware may be spread. A typical case in which the infection spreads to a plurality of devices is a pattern in which a vulnerable device not having sufficient anti-malware measures becomes the source of infection and the malware is spread to the other devices. It is considered that a vulnerable device not having sufficient anti-malware measures may not be used or set correctly from the standpoint of anti-malware measures because the user who uses the device is poor in knowledge of malware, for example, and risk awareness is low. If such a user uses other devices, the user may cause the other devices to be infected with the malware.

The present disclosure has been made in view of the circumstances as described above, and provides an image processing apparatus capable of suppressing the spread of malware infection by restricting the subsequent data reception from both standpoints of the user and the device involved with the infection.

An image processing apparatus according to one aspect of the present disclosure is provided with: a data receiver which receives, from outside, data including user information and device information; a malware checker which checks whether the received data includes malware; and a reception restrictor which restricts, on or after detection of the malware from the data by the checking, reception of at least specific data from the outside. The specific data is, if a user is specifiable on the basis of the user information, data related to the user, and is, if a device which has provided the data is specifiable on the basis of the device information, data provided from the device.

Further, a malware checking method according to one aspect of the present disclosure, which is executed by a controller of an image processing apparatus, includes: a step of receiving, from outside, data including user information and device information; a step of checking whether the received data includes malware; and a step of restricting, on or after detection of the malware from the data by the checking, reception of at least specific data from the outside. The specific data is, if a user is specifiable on the basis of the user information, data related to the user, and is, if a device which has provided the data is specifiable on the basis of the device information, data provided from the device.

According to one aspect of the present disclosure, in the image processing apparatus, the reception restrictor restricts the reception of at least the specific data from the outside on or after the detection of malware. The specific data is, if a user is specifiable on the basis of the user information, data related to the user, and is, if a device which has provided the data is specifiable on the basis of the device information, data provided from the device. Consequently, the spread of malware infection can be suppressed by restricting the subsequent data reception from both standpoints of the user and the device involved with the infection. In addition, according to one aspect of the present disclosure, the malware checking method can also suppress the spread of malware infection by restricting the subsequent data reception from both standpoints of the user and the device involved with the infection.

BRIEF DESCRIPTION OF THE DRAWINGS

FIG. 1 is a block diagram illustrating a configuration of a multifunction peripheral as one mode of an image processing apparatus according to the present disclosure.

FIG. 4 is an explanatory diagram showing an example of a linkage table illustrated in FIG. 1.

FIG. 5 is an explanatory diagram illustrating a target of reception restriction when at least one of a device and a user is specified on the basis of data in which malware has been detected in the present disclosure.

FIG. 6 is an explanatory diagram showing an example of reception restriction corresponding to the linkage table illustrated in FIG. 4 and the contents indicated in FIG. 5.

FIG. 9 is an explanatory diagram illustrating a condition for, in a state in which reception restriction on a device is executed, removing the reception restriction in the present disclosure.

FIG. 10 is an explanatory diagram illustrating a condition for, in a state in which reception restriction on a user is executed, removing the reception restriction in the present disclosure.

FIG. 14 is an explanatory diagram showing an example of a list display screen for reception-restricted users, which is displayed on an operation unit in the present disclosure.

FIG. 15 is an explanatory diagram showing an example of a user cancellation confirmation screen displayed on an operation unit in the present disclosure.

FIG. 16 shows an example of the contents of notification to be made to an administrator by the reception restrictor when malware is detected.

FIG. 17 shows an example of the contents of notification to be made to a specific user by the reception restrictor when malware is detected.

FIG. 18 shows an example of the contents of notification to be made to an estimated user by the reception restrictor when malware is detected.

FIG. 19 shows an example of the contents of notification to be made to a secondary estimated user by the reception restrictor when malware is detected.

DETAILED DESCRIPTION OF THE INVENTION

Figure 2:
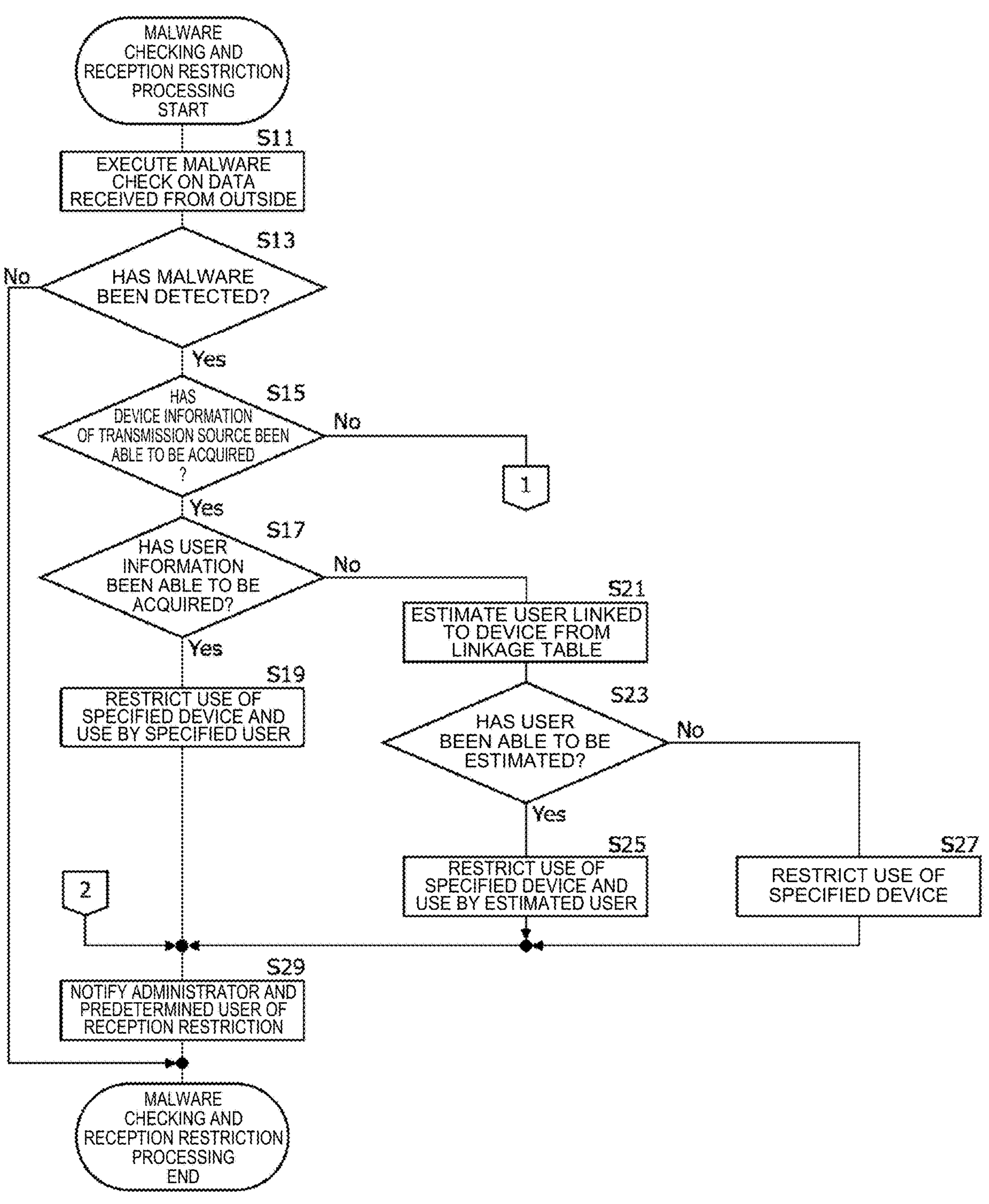
FIG. 2 is a first flowchart illustrating an example of processing executed by a malware checker and a reception restrictor illustrated in FIG. 1.

The present disclosure will be described in more detail with reference to the accompanying drawings. The following description is illustrative in all respects and should not be construed as limiting the present disclosure.

Embodiment 1

Configuration of Image Processing Apparatus

FIG. 1 is a block diagram illustrating a configuration of a multifunction peripheral as one mode of an image processing apparatus according to the present disclosure. As illustrated in FIG. 1, a multifunction peripheral 200 is provided with a controller 210, a data receiver 220, a storage 230, a standard file system 240, an image file system 250, an operation unit 260, a scanner portion 270, and a printer portion 280. The controller 210 is mainly composed of a processor as hardware, and controls each element of the multifunction peripheral 200. As the processor executes a processing program, a function as the controller is implemented.

The controller 210 includes a malware checker 211 and a reception restrictor 214. The controller 210 may further include a linkage table setter 215 and a linkage table updater 216. The malware checker 211 performs a malware check on data (input-output data) that is input to and output from the multifunction peripheral 200 via the data receiver 220, and data (stored data) that is stored in the multifunction peripheral 200. When the data is input or output, the malware checker 211 performs a malware check on the input-output data by real-time scanning. In particular, the malware checker 211 performs a malware check on data (input data) that the multifunction peripheral 200 receives from an external device. The malware check is performed because if data received from the external device is infected with malware, the data stored in the multifunction peripheral 200 or the data to be output to an external device by the multifunction peripheral 200 may be infected, and the infection may spread. In addition, the malware checker 211 executes an on-demand scan on the basis of a user instruction. A flow of the input-output data to be subjected to the real-time scan and the on-demand scan is indicated as a flow passing through a connector RSC shown by a circle in FIG. 1. Further, malware check of the stored data is performed by a scheduled scan which is executed when the time set in advance arrives. The stored data to be subjected to the scheduled scan is data stored in the storage 230, the standard file system 240, and the image file system 250. Those kinds of data exist at a distal end of a dashed line arrow illustrated in FIG. 1.

The reception restrictor 214 restricts, when the malware check executed by the malware checker 211 detects that the data received from the outside includes malware, in other words, the data is one in which malware is embedded, reception of specific data from the outside. If transmission and reception of all kinds of data is restricted, irrelevant users are greatly affected, and thus, data reception from the outside for the specific data is restricted. Further, output of data to the outside may be restricted. However, in the present specification, restriction on data reception from the outside is focused. This is because if reception of data to be brought from the outside which is infected with malware can be stopped, it is possible to prevent the data of the device of itself (i.e., the multifunction peripheral) from being infected with the malware and security is secured, meaning that if security is secured, the infection will not spread even if the data is output.

In the present specification, the specific data refers to data from a user associated with the data including malware or a device associated with such data. Details will be described later. The linkage table setter 215 receives the setting of a linkage table 232 of the storage 230, which will be described later, by the user. The linkage table updater 216 executes processing in which the controller 210 updates the contents of the linkage table 232 of the storage 230 without involving a user operation.

The data receiver 220 acquires electronic data from the outside of the multifunction peripheral 200. Electronic data is also output to the outside of the multifunction peripheral 200. Specifically, the data is input to and output from a universal serial bus (USB) memory or an external device connected via a USB interface portion 221. Further, facsimile data is transmitted or received (input or output) via a facsimile transceiver 222. Furthermore, the data receiver 220 communicates with an external device via a network interface portion 223, and performs input and output of the data. A communication scheme of a network and whether the network is wired or wireless is not questioned. For instance, wired LAN network communication may be employed as an example. A Bluetooth interface portion 224 performs input and output of data to and from an external device via Bluetooth (registered trademark) communication. When the data receiver 220 receives electronic data from the outside, the data receiver 220 adds the received time to the received data and stores the received data in the storage 230.

The storage 230 stores data for control. In addition, the storage 230 stores a processing program to be executed by the processor of the controller 210. As hardware, the storage 230 is composed of, for example, a combination of a dynamic random access memory (DRAM), which is a volatile memory, and an electrically erasable and programmable read-only memory (EEPROM) or a flash memory, which is a nonvolatile memory.

Data to be stored in the storage 230 includes the linkage table 232, address book data 233, scan data 234, facsimile reception data 235, and spool data 236. Other than the above, the data received by the data receiver 220 from the outside is temporarily stored in at least a predetermined area. The malware checker 211 checks whether no malware is embedded in the received data that is stored in the predetermined area of the storage 230. In addition, when either user information or device information is included in the received data, the information is extracted and added as an attribute. When data reception restriction and removal of the restriction are performed, the data receiver 220 uses the reception time, the user information, and the device information that have been added to the data. In the present disclosure, it is assumed that at least a part of the input-output data includes at least one of the user information, which is information on a user associated with the input-output data, and the device information, which is information on a device associated with the input-output data. For example, when data related to a job includes information related to user authentication, the user information indicates the information related to the user authentication. For example, when the received data includes a transmission source device, the device information indicates information related to that device. The linkage table 232 stores data indicating association between the user and the device on the basis of the setting made by the user, or on the basis of a history of the user information and the device information included in the input-output data.

The address book data 233 stores address book data 241, which is stored in the standard file system 240, in other words, address book data which is displayed on a screen of an operation unit of the address book and is also used for transmission (output) of the data. The scan data 234 corresponds to a storage area (a page memory) where data of a document, which has been read by the scanner portion 270, is temporarily stored. The facsimile reception data 235 corresponds to a storage area where facsimile data, which has been received by the facsimile transceiver 222, is temporarily stored. The spool data 236 corresponds to a storage area where the spool data 236 is temporarily stored. The controller 210 copies, to the spool data 236, pieces of spool data whose priority is high that are held in spool data 242 of the standard file system 240, and sends the copied spool data to the printer portion 280 for printing to be executed.

The standard file system 240 stores data necessary for executing a specific function. As hardware, the standard file system 240 is mainly composed of a hard disk drive (HDD) or a solid state drive (SSD), and the hardware in common with the image file system 250 may be employed. The standard file system 240 includes the address book data 241 and the spool data 242. The address book data 241 stores data of an address book. The address book stores data relating to destinations of facsimile transmission made via the facsimile transceiver 222 and destinations of e-mail sent via the network interface portion 223. The spool data 242 is data based on which printing is to be performed by the printer portion 280.

The image file system 250 stores image data of a document read by the scanner portion 270 and image data based on print data that is input via the USB interface portion 221 or the network interface portion 223. The image file system 250 includes primary save data 251, secondary save data 252, a general-purpose download file 253, public PDF data 254, and facsimile reception data 255.

The primary save data 251 is image data stored such that the image data can be provided whenever necessary, in other words, image data stored with a data filing function, which is provided by the multifunction peripheral 200, being applied. The secondary save data 252 is image data which is prepared to be provided to the outside, and is temporarily stored. The general-purpose download file 253 is, for example, image data downloaded for printing from an external device such as a cloud server. The public PDF data 254 is, for example, data such as a user manual provided by the multifunction peripheral 200 in a portable document format (PDF). The facsimile reception data 255 is image data received by the facsimile transceiver 222.

The operation unit 260 is structured by including a display device, such as a liquid crystal display (LCD) or an organic light emitting display (OLED) that displays the state of the multifunction peripheral 200 or information related to an operation, and an input detection device, such as a touch panel that detects the operation. The scanner portion 270 includes a mechanism and a circuit for scanning and reading a document and an image sensor, and is a part that reads the document. The printer portion 280 includes a mechanism and a circuit for performing charging, exposure, image development, transfer, and fusing of an electrophotographic method in the present disclosure, a paper feed tray for accommodating printing paper, and a paper feeding/conveyance mechanism for feeding and conveying the accommodated printing paper, and performs printing. The electrophotographic method is an example, and the printing may be performed by other methods.

Figure 3:
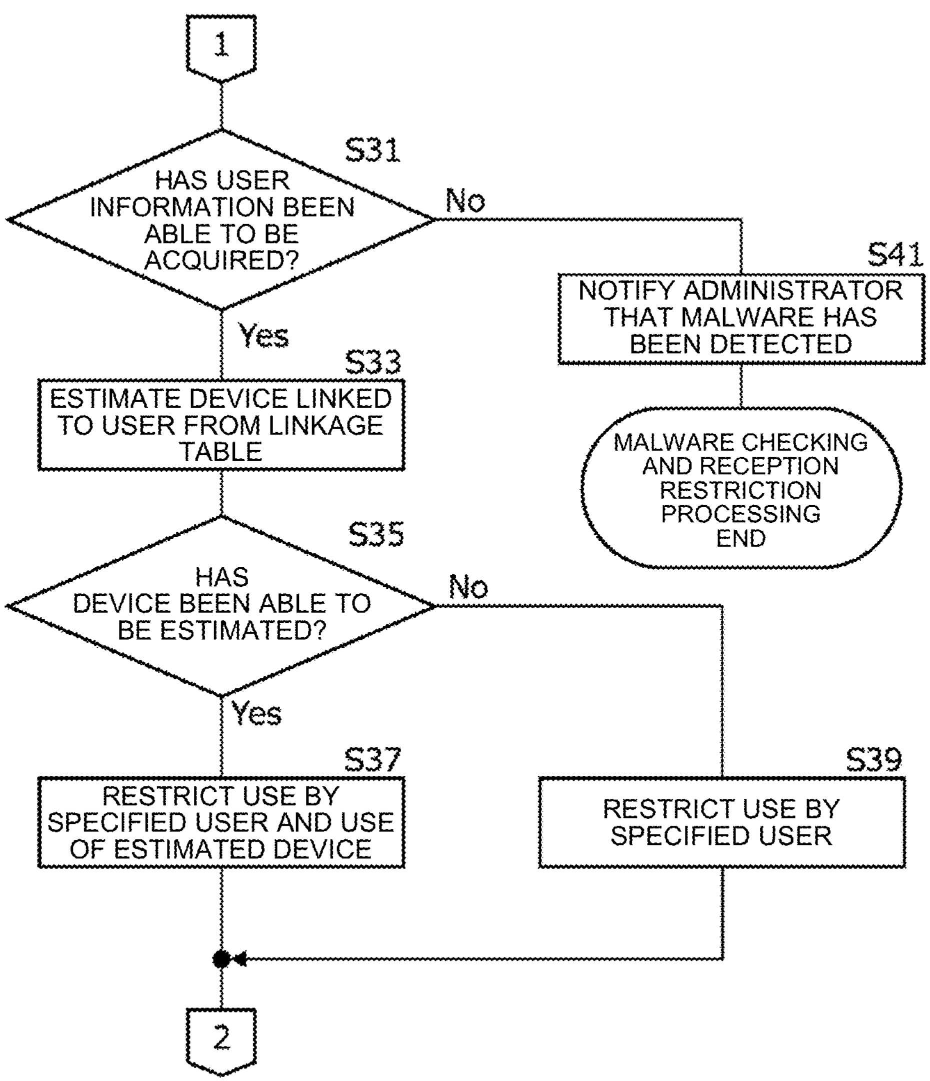
FIG. 3 is a second flowchart illustrating an example of processing executed by the malware checker and the reception restrictor illustrated in FIG. 1.

Malware Checking and Reception Restriction Imposed Upon Malware Detection Next, processing related to malware checking and reception restriction imposed upon malware detection, which are executed by the controller 210, will be described. FIGS. 2 and 3 are flowcharts illustrating an example of processing that the controller 210 executes as the malware checker 211 and the reception restrictor 214. As indicated in FIG. 2, when the data receiver 220 receives data from the outside, the controller 210 as the malware checker 211 performs a malware check on the received data (step S11).

As a result of performing the malware check, when it is determined that no malware is embedded in the received data (No in step S13), the processing is ended. Meanwhile, if malware is detected in the received data (Yes in step S13), the controller 210 as the reception restrictor 214 determines whether the received data includes device information and whether a transmission source device can be specified on the basis of the device information (step S15). For example, when the data includes information for specifying the transmission source device as information related to transmission and reception, that information corresponds to the device information.

If the transmission source device information has been able to be acquired, the reception restrictor 214 then determines whether the received data includes user information and whether the user associated with the received date can be specified on the basis of the user information (step S17). For example, when the received data is related to a job involving user authentication, information related to the user authentication corresponds to the user information. If a user associated with the data can be specified (Yes in step S17), the reception restrictor 214 restricts, from then onward, data reception from the device specified on the basis of the device information and reception of data associated with the user which has been specified on the basis of the user information (step S19). Then, an administrator of the multifunction peripheral 200 or a system including the multifunction peripheral 200 and a predetermined user are notified that malware has been detected from the received data, and that the subsequent data reception will be restricted for the specific device and user (step S29). It is assumed that contact addresses of the administrator and the user to whom notification should be made are registered in advance. According to this mode, when the reception restrictor restricts the reception of data, for example, a notification is sent to an address that is registered in advance of an administrator and a predetermined user of an image processing apparatus, and an address included in the user information of the data, so that it is possible to make the counterpart persons recognize that the reception of data is restricted.

In the determination of step S17 mentioned above, when it is determined that the user cannot be specified on the basis of the user information (No in step S17), the reception restrictor 214 refers to the linkage table 232 of the storage 230. The linkage table 232 stores data indicating association between the user and the device. An attempt is made to estimate the user linked to the device which has been specified in the determination of the above step S15 on the basis of the linkage table 232 (step S21). When the specified device is stored in the linkage table 232, and thus, one or more users linked to that device can be estimated (Yes in step S23), the subsequent use of the device which has been specified on the basis of the device information, and the subsequent use by the user estimated on the basis of the linkage table 232 are restricted (step S25). Details of the reception restriction will be described later. According to such a configuration, even in a case where data in which malware has been detected includes the device information but does not include the user information, it is possible to estimate the user linked to the device with reference to the linkage table, and restrict the reception of data related to the estimated user. By doing so, it is possible to restrict reception of data related to a user who may have become infected with malware, thereby preventing the infection from being spread. After that, the reception restrictor 214 shifts the processing to step S29 mentioned above, sends a notification to the administrator and the predetermined user, and ends the processing.

In the processing of the above step S21, when the specified device is not stored in the linkage table 232, and thus, one or more users linked to the device cannot be estimated (No in step S23), the reception restrictor 214 restricts the subsequent use of the specified device (step S27). Then, the reception restrictor 214 shifts the processing to step S29 mentioned above, sends a notification to the administrator and the predetermined user, and ends the processing. In the above step S27, use by all users may be restricted in order to be extremely cautious. In that case, after all, reception of all kinds of data or input and output of all kinds of data is restricted.

In the determination of the above step S15, a case where the transmission source device cannot be specified (No in step S15) will be described. In that case, the reception restrictor 214 determines whether the received data includes user information and whether the user associated with the received date can be specified on the basis of the user information (i.e., step S31 indicated in FIG. 3).

If the user associated with the data can be specified (Yes in step S31), the reception restrictor 214 refers to the linkage table 232. An attempt is made to estimate the device linked to the user which has been specified in the determination of the above step S31 on the basis of the linkage table 232 (step S33). When the specified user is stored in the linkage table 232, and thus, one or more devices linked to that user can be estimated (Yes in step S35), the subsequent use by the user who has been specified on the basis of the user information, and the subsequent use of the device estimated on the basis of the linkage table 232 are restricted (step S37). Details of the reception restriction will be described later. According to such a configuration, even in a case where data in which malware has been detected includes the user information but does not include the device information, it is possible to estimate the device linked to the user with reference to the linkage table, and restrict the reception of data provided from the device. By doing so, it is possible to restrict reception of data from a device which may have become infected with malware, thereby preventing the infection from being spread.

After that, the reception restrictor 214 shifts the processing to step S29 indicated in FIG. 2, sends a notification to the administrator and the predetermined user, and ends the processing. In the processing of the above step S35, when the specified user is not stored in the linkage table 232, and thus, one or more devices linked to the user cannot be estimated (No in step S35), the reception restrictor 214 restricts the subsequent use by the specified user (step S39). Then, the reception restrictor 214 shifts the processing to step S29 of FIG. 2, sends a notification to the administrator and the predetermined user, and ends the processing.

In the above step S39, use of all devices may be restricted in order to be extremely cautious. In that case, after all, reception of all kinds of data or input and output of all kinds of data is restricted. Further, in the determination of step S31, if the user cannot be specified (No in step S31), in other words, if neither the device nor the user can be specified from the received data, the reception restrictor 214 sends a notification to an administrator determined in advance (step S41) and ends the processing. In the above step S41, reception of all kinds of data or input and output of all kinds of data may be restricted in order to be extremely cautious. Described above is an example of processing related to malware checking and reception restriction imposed upon malware detection which are executed by the controller 210.

Linkage Table and Reception Restriction Based on Linkage Table

Next, details of the reception restriction to be performed by the reception restrictor 214 when malware is detected from the received data will be described. In particular, the structure of the linkage table 232 and the reception restriction based on the linkage table 232 will be described. FIG. 4 is an explanatory diagram showing an example of the linkage table 232 indicated in FIG. 1. As illustrated in FIG. 4, the linkage table 232 stores data indicating one or more users and devices associated with the respective users. The data of the linkage table 232 can be set by the user by using the linkage table setter 215. According to this mode, the user can create and update the linkage table corresponding to the situation of use of the image processing apparatus. Further, the linkage table updater 216 may register, in the linkage table 232 as a history, the user information and the device information included in the data received from the outside via the data receiver 220. According to this mode, the linkage table is updated in accordance with the history of data reception of the image processing apparatus.

In the example illustrated in FIG. 4, Device 1 and Device 2 are registered as the devices associated with user A. Device 1 and Device 3 are registered as the devices associated with user B. Further, Device 2 is registered as the device associated with user C, and Device 3 is registered as the device associated with user D. In FIG. 4, although the device associated with the user is registered for each user, conversely, the user associated with the device may be registered for each device.

FIG. 5 is an explanatory diagram illustrating a target of reception restriction which is to be executed by the reception restrictor 214 when at least one of the device and the user is specified on the basis of the data in which malware has been detected by the malware checker 211. For example, it is assumed that malware has been detected from data related to a print job.

The case where the device has been able to be specified from the device information of the data in which malware was detected corresponds to IDs 1 to 4 of FIG. 5. Also, the case where the user has been able to be specified from the user information of the aforementioned data corresponds to IDs 1 to 2, and 5 to 7. The case where the device has not been able to be specified but the device linked to the user has been able to be estimated by using the linkage table 232 corresponds to IDs 5 to 7. The case where the user has not been able to be specified but the user linked to the device has been able to be estimated by using the linkage table 232 corresponds to IDs 3 to 4.

IDs 1 to 7, which are a combination of the cases, will be discussed sequentially. IDs 1 and 2 indicate the restriction imposed when the device and the user have been able to be specified on the basis of the aforementioned data. The device to be set as the target of reception restriction in the above case is the device (specific device) which has been specified from the device information. From then onward, the reception restrictor 214 prohibits reception of data from the specific device. That is, when the device information of the received data indicates the specific device, the reception restrictor 214 discards the received data without further performing the processing related to the data (i.e., ID 1 indicated in FIG. 5). Even if the data in which malware has been detected is data related to a print job, the reception restrictor 214 prohibits reception of all kinds of data sent from the specific device. The all kinds of data not only include a job other than the print job, such as a facsimile reception job, for example, but also include data that is not related to any job, such as an address book.

Further, the user to be set as the target of reception restriction is the user (specific user) who has been specified from the user information. From then onward, the reception restrictor 214 prohibits reception of data related to the specific user. That is, when the user information of the received data indicates the specific user, the reception restrictor 214 discards the received data without further performing the processing related to the data. Data related to all jobs of the specific user is the target of reception restriction (i.e., ID 2 indicated in FIG. 5).

IDs 3 and 4 indicate the restriction imposed when the device can be specified on the basis of the data but the user is unable to be specified, and the user has been able to be estimated by using the linkage table 232. In that case, the device to be set as the target of reception restriction is the specific device as in the case of ID 1. When the device information of the received data indicates the specific device, the reception restrictor 214 discards the received data without further performing the processing related to the data (i.e., ID 3 indicated in FIG. 5).

The user to be set as the target of reception restriction is the user (estimated user) who is linked to the specific device with reference to the linkage table 232. From then onward, the reception restrictor 214 prohibits reception of data related to the estimated user. That is, when the user information of the received data indicates the estimated user, the reception restrictor 214 discards the received data without further performing the processing related to the data. Data related to all jobs of the estimated user is the target of reception restriction (i.e., ID 4 indicated in FIG. 5). This is because the estimated user may have used the specific device infected with malware.

IDs 5 to 7 indicate the restriction imposed when the device is unable to be specified on the basis of the data, and thus, the device has been estimated by using the linkage table 232, but the user has been able to be specified. In that case, the device to be set as the target of reception restriction is the device (estimated device) which is linked to the specific user with reference to the linkage table 232. That is, when the device information of the received data indicates the estimated device, the reception restrictor 214 discards the received data without further performing the processing related to the data (i.e., ID 5 indicated in FIG. 5). The user to be set as the target of reception restriction is the specific user as in the case of ID 2. That is, when the user information of the received data indicates the specific user, the reception restrictor 214 discards the received data without further performing the processing related to the data (i.e., ID 6 indicated in FIG. 5).

Furthermore, the reception restrictor 214 extends the range of users to be set as the target of reception restriction. The range of users to be extended is the user (secondary estimated user) who is linked to the estimated device with reference to the linkage table 232. From then onward, the reception restrictor 214 prohibits reception of data of a print job related to the secondary estimated user. That is, when the user information of data related to the received print job indicates the secondary estimated user, the data is discarded without performing the processing related to the data. As for the secondary estimated user, data related to a print job of the same type as the data in which malware has been detected is the target of reception restriction (i.e., ID 7 indicated in FIG. 5). Although the estimated device is set as the target of reception restriction, since the device information is not included in the data in which malware has been detected, it is highly likely that the device information will not be included in the data to be received from the same device thereafter. Therefore, pieces of data of all jobs of the specific user and pieces of data related to a print job of the secondary estimated user are to be restricted. The degree of accuracy is different between a case where a device of a providing source has been able to be specified with reliability on the basis of the device information of the data and a case where the device of the providing source has been estimated with reference to the linkage table. According to this mode, by applying a different mode of restriction to a different degree of accuracy, it is possible to take appropriate measures so that the user is not inconvenienced by the excessive restriction while suppressing the spread of infection of the malware.

Specific examples will be described. FIG. 6 is an explanatory diagram showing an example of the reception restriction corresponding to the linkage table 232 illustrated in FIG. 4 and the contents indicated in FIG. 5. It is assumed that the specific device indicated in FIG. 5 is Device 1 and the specific user is user A. In that case, the device which becomes the target of reception restriction is Device 1, i.e., the specific device (corresponding to ID 1 indicated in FIG. 5). The user who becomes the target of reception restriction is user A, i.e., the specific user (corresponding to ID 2 indicated in FIG. 5). In addition, in a case where the device can be specified but the user is unable to be specified and so the user has been estimated with reference to the linkage table 232, the device which becomes the target of reception restriction is Device 1, i.e., the specific device (corresponding to ID 3 indicated in FIG. 5). The users who become the target of reception restriction are two estimated users, who are user A and user B, linked to Device 1 in the linkage table 232 illustrated in FIG. 4 (i.e., corresponding to ID 4 indicated in FIG. 5).

In contrast, in a case where the device is unable to be specified and so the device has been estimated with reference to the linkage table 232, but the user has been able to be specified, the devices which become the target of reception restriction are two estimated devices, which are Device 1 and Device 2, linked to user A in the linkage table 232 indicated in FIG. 4 (i.e., corresponding to ID 5 indicated in FIG. 5). The user who becomes the target of reception restriction is, initially, user A, i.e., the specific user (corresponding to ID 6 indicated in FIG. 5). As for user A, who is the specific user, data related to all jobs is the target of restriction. Furthermore, two secondary estimated users, who are user B and user C, linked to either one of Device 1 and Device 2 which are the estimated devices in the linkage table 232 illustrated in FIG. 4, become the target of reception restriction. User B is the secondary estimated user linked to Device 1, which is the estimated device. User C is the secondary estimated user linked to Device 2, which is the estimated device. The reception restrictor 214 restricts the data reception by restricting the data to be received to data related to a print job for user B and user C who are the secondary estimated users. The specific examples shown in FIG. 6 have been described above.

Setting Operation Using Linkage Table Setter

Figures 7, 8:
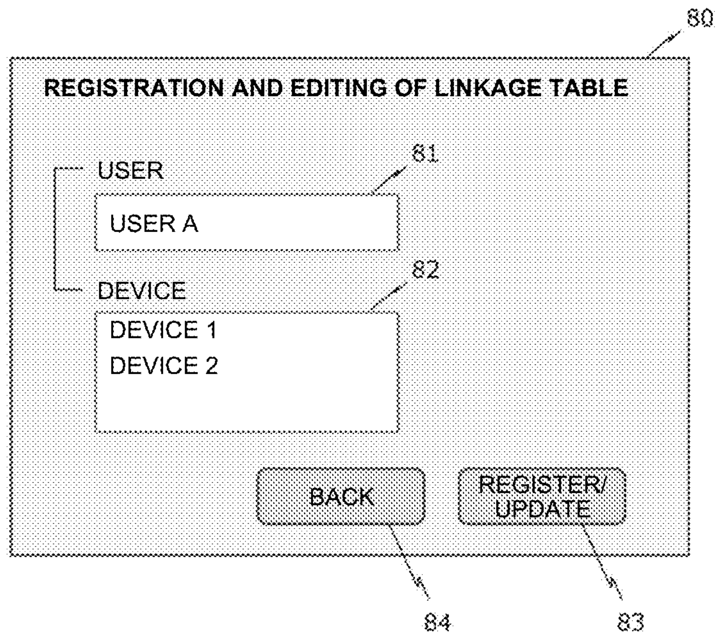
FIG. 7 is an explanatory diagram showing an example of a setting operation of a linkage table using a linkage table setter illustrated in FIG. 1.
FIG. 8 is an explanatory diagram showing an example of a setting operation of the linkage table using the linkage table setter illustrated in FIG. 1.

The linkage table setter 215 receives the setting of the linkage table 232 by the user. An example of a setting operation of the linkage table 232 using the linkage table setter 215 will be described below. FIGS. 7 and 8 are explanatory diagrams each showing an example of the setting operation of the linkage table 232 using the linkage table setter 215 indicated in FIG. 1. The figures show an operation example of the case of adding data to the linkage table 232 or editing the registered data.

FIG. 7 is an explanatory diagram illustrating a linkage table list display screen. When the controller 210 recognizes that the user has performed a predetermined operation on the operation unit 260 indicated in FIG. 1, the controller 210 causes the operation unit 260 to display a list display screen 70, which displays as a list the linkage table, as illustrated in FIG. 7. On the list display screen 70, which displays as a list the linkage table, the contents of the linkage table illustrated in FIG. 4 are displayed as a list. For example, when it is recognized that the row of ID 1, in other words, the row of user A, of the list display is touched, the linkage table setter 215 recognizes that ID 1 has been selected. Then, the selected state is displayed by changing, for example, the background color of the display for the row of ID 1 to be different from that of the other rows. FIG. 7 shows the state in which the row of ID 1 is selected.

In such a state, when a [register/edit] key 71 at the lower right part of the list display screen 70, which displays as a list the linkage table, is touched, the linkage table setter 215 causes the operation unit 260 to display a register/edit screen 80 illustrated in FIG. 8. When a [cancel] key 72 on the left side of the [register/edit] key 71 is touched, the linkage table setter 215 clears the list display screen 70 so that the display is returned to the display of the previous screen. On the register/edit screen 80 illustrated in FIG. 8, pieces of data stored in each of a user input field 81 and a device input field 82 with respect to the selected ID 1 are displayed in such a way that the data can be edited. A [register/update] key 83 and a [back] key 84 are arranged therebelow. The user can add, edit, or delete the contents of the user input field 81 and/or the device input field 82. After that, when the [register/update] key 83 is touched, the linkage table setter 215 updates the linkage table 232 so that the contents reflect the addition, editing, or deletion. In this way, the user can set the contents of the linkage table 232 by using the linkage table setter 215.

Removal of Reception Restriction

Next, processing of removing the reception restriction when appropriate action against malware is taken after the reception restrictor 214 has executed the reception restriction illustrated in FIG. 5 will be described. FIG. 9 is an explanatory diagram illustrating a condition for, in a state in which reception restriction on a device is executed, removing the reception restriction. FIG. 10 is an explanatory diagram illustrating a condition for, in a state in which reception restriction on a user is executed, removing the reception restriction.

IDs indicated in FIGS. 9 and 10 correspond to the IDs indicated in FIG. 5. For example, ID 1 shown in FIG. 9 indicates that, in a state in which the device and the user are specified and reception restriction on a specific device is executed as illustrated by ID 1 of FIG. 5, the reception restriction is to be removed if malware disinfection of the specific device is confirmed. In this case, when the administrator recognizes that the malware disinfection of the specific device has been confirmed and performs a predetermined reception restriction removal operation to be described later, the controller 210 serving as the reception restrictor 214 may recognize the operation and remove the reception restriction. Alternatively, for example, in a case where the multifunction peripheral 200 is connected to an intranet and is communicable with a server which manages the security of each device on the intranet, the reception restrictor 214 may remove the reception restriction by receiving a notification from the server notifying that a condition for removing the reception restriction is satisfied.

Further, ID 2 shown in FIG. 10 indicates that, in a state in which the device and the user are specified and reception restriction on a specific user is executed as illustrated by ID 2 of FIG. 5, the reception restriction is to be removed if malware disinfection of the device used by the specific user is confirmed. A device used by the specific user other than the specific device may be distinguished by the administrator by conducting a hearing from the specific user. Alternatively, a security management server on the intranet described above may recognize the users who use the respective devices on the intranet, and the device used by the specific user may be distinguished on the basis of the recognition. ID 3 shown in FIG. 9 is similar to ID 1.

ID 4 shown in FIG. 10 indicates the condition for removing the reception restriction by categorizing the estimated user into two types. The above categorization is based on the presence or absence of use of the specific device in a period (a target period indicated by a note in FIG. 10), which is defined from the point of time of receipt of data in which malware was detected, and retroactively back to the point of time of the latest receipt of data in which no malware was detected from the same device. The reception restrictor 214 acquires the target period on the basis of the reception time added to the received data. Then, the estimated user who has used the specific device during the target period is deemed to be a user infected with malware (i.e., a deemed infected user), and the estimated user who has not used the specific device during the target period is deemed to be a user not infected with the malware (i.e., a deemed non-infected user). The condition for removing the reception restriction is that, for a device which has been used by the deemed infected user, malware disinfection of the device has been confirmed. If the estimated user is confirmed as the deemed non-infected user, when it has been confirmed that the device is used only by the deemed non-infected user, the device is excluded from the target of the reception restriction. The degree of accuracy is different between a case where the user has been able to be specified with reliability on the basis of the user information of the data and a case where the user has been estimated with reference to the linkage table. According to this mode, by applying a different mode of restriction removal condition to a different degree of accuracy, it is possible to take appropriate measures so that the user is not inconvenienced by the excessive restriction while suppressing the spread of infection of the malware.

ID 5 shown in FIG. 9 indicates the condition for removing the reception restriction by categorizing the estimated device into two types. The device used by the specific user at the time of malware detection is deemed to be a device infected with malware (i.e., a deemed infected device), and the device not used by the specific user at the time of malware detection is deemed to be a device not infected with malware (i.e., a deemed non-infected device). As for the deemed infected device, as in the cases of ID 1 and ID 3, the condition for removing the reception restriction is that malware disinfection of the device has been confirmed. Meanwhile, as for the deemed non-infected device, the condition for removing the reception restriction is that the device has been confirmed as not being the deemed infected device. The degree of accuracy is different between a case where a device of a providing source has been able to be specified with reliability on the basis of the device information of the data and a case where the device of the providing source has been estimated with reference to the linkage table. According to this mode, by applying a different mode of restriction removal condition to a different degree of accuracy, it is possible to take appropriate measures so that the user is not inconvenienced by the excessive restriction while suppressing the spread of infection of the malware.

ID 6 shown in FIG. 10 is similar to ID 2. In ID 7 shown in FIG. 10, the secondary estimated users are classified into two types. The secondary estimated user is a user who is further linked, via the linkage table 232, to the estimated device which is linked to the specific user on the basis of the linkage table 232. The first type corresponds to the secondary estimated user linked to a device used by the specific user at the time of malware infection, i.e., the deemed infected device. The condition for removing the reception restriction is that, for the first secondary estimated user, malware disinfection of the device used by the secondary estimated user has been confirmed. The second type corresponds to the secondary estimated user linked to a device not used by the specific user at the time of malware infection, i.e., the deemed non-infected device. As for the second secondary estimated user, if it is confirmed that the user is a user linked to only the deemed non-infected device, the device used only by the user is excluded from the target of the reception restriction. Described above is the processing related to removal of the reception restriction.

Operation Screen Related to Removal of Reception Restriction

As described above, removal of the reception restriction may be carried out by an operation of the administrator. Alternatively, the reception restrictor 214 may acquire achievement of a state in which a predetermined condition is satisfied from, for example, a security management server and remove the reception restriction. FIGS. 11 to 15 illustrate examples of an operation screen to be displayed in removing the reception restriction when the controller 210 receives a predetermined operation by the user via the operation unit 260.

Figure 11:
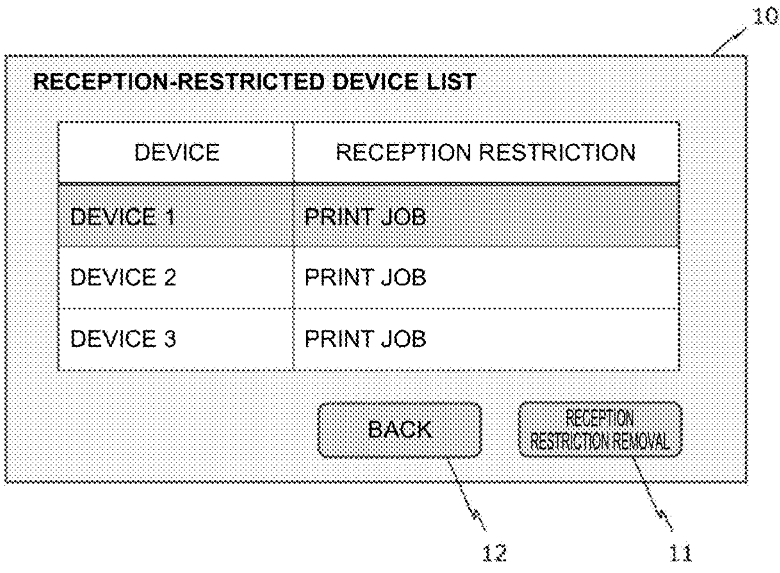
FIG. 11 is an explanatory diagram showing an example of a list display screen for reception-restricted devices, which is displayed on an operation unit in the present disclosure.

FIG. 11 is an explanatory diagram illustrating a list display screen which displays as a list reception-restricted devices. When the controller 210 recognizes that the user has performed a predetermined operation on the operation unit 260 indicated in FIG. 1, the controller 210 causes the operation unit 260 to display a list display screen 10, which displays as a list the reception-restricted devices, as illustrated in FIG. 11. On the list display screen 10, which displays as a list the reception-restricted devices, the devices set as the target of reception restriction and the contents of the restriction are displayed as a list. For example, when it is recognized that Device 1 in the list display is touched, the controller 210 recognizes that Device 1 has been selected. Then, the selected state is displayed by changing, for example, the background color of the display for Device 1 to be different from that of the other rows. FIG. 11 shows the state in which Device 1 is selected. In such a state, when a [reception restriction removal] key 11 at the lower right part of the list display screen 10, which displays as a list the reception-restricted devices, is touched, the controller 210 causes the operation unit 260 to display a device cancellation confirmation screen 20 illustrated in FIG. 12. When a [back] key 12 on the left side of the [reception restriction removal] key 11 is touched, the controller 210 clears the list display screen 10 so that the display is returned to the display of the previous screen.

Figure 12:
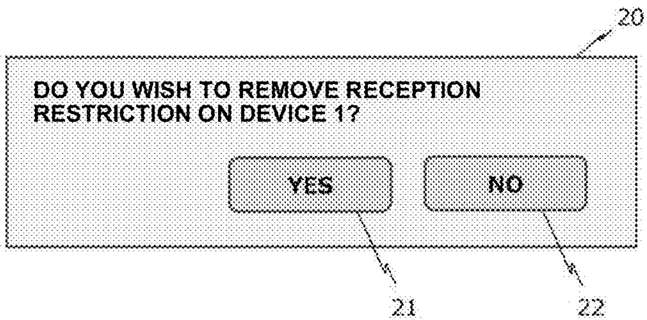
FIG. 12 is an explanatory diagram showing an example of a device cancellation confirmation screen displayed on an operation unit in the present disclosure.

On the device cancellation confirmation screen 20 illustrated in FIG. 12, a [YES] key 21 and a [NO] key 22 are arranged together with a message requesting confirmation of the removal of the reception restriction for the selected Device 1. When the [YES] key 21 is touched, the controller 210 causes the operation unit 260 to display a linked user cancellation confirmation screen 30 illustrated in FIG. 13. When the [NO] key 22 is touched, the controller 210 clears the device cancellation confirmation screen 20 so that the display is returned to the display of the previous list display screen 10, which displays as a list the reception-restricted devices.

Figure 13:
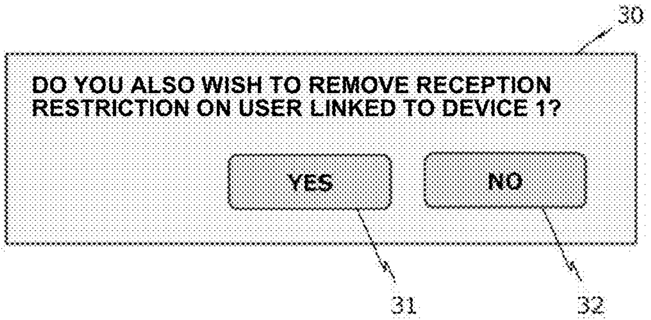
FIG. 13 is an explanatory diagram showing an example of a linked user cancellation confirmation screen displayed on an operation unit in the present disclosure.

On the linked user cancellation confirmation screen 30 illustrated in FIG. 13, a [YES] key 31 and a [NO] key 32 are arranged together with a message requesting confirmation of whether to also remove the reception restriction for the user linked to Device 1. When the [YES] key 31 is touched, the controller 210 removes the reception restriction on Device 1 and the user linked to Device 1. Then, the operation unit 260 is caused to display the list display screen 10, which displays as a list the reception-restricted devices, as illustrated in FIG. 11. According to this mode, in removing the reception restriction on the deemed non-infected device, the reception restriction on a user linked to the deemed non-infected device can also be removed together. When the [NO] key 32 is touched, the controller 210 removes the reception restriction on Device 1. The reception restriction related to a user linked to Device 1 is not removed. Then, the operation unit 260 is caused to display the list display screen 10, which displays as a list the reception-restricted devices, as illustrated in FIG. 11.

FIG. 14 is an explanatory diagram illustrating a list display screen which displays as a list reception-restricted users. When the controller 210 recognizes that the user has performed a predetermined operation on the operation unit 260 indicated in FIG. 1, the controller 210 causes the operation unit 260 to display a list display screen 40, which displays as a list reception-restricted users, as illustrated in FIG. 14. On the list display screen 40, which displays as a list the reception-restricted users, the users set as the target of reception restriction and the contents of the restriction are displayed as a list. For example, when it is recognized that user A in the list display is touched, the controller 210 recognizes that user A has been selected. Then, the selected state is displayed by changing, for example, the background color of the display for user A to be different from that of the other rows. FIG. 14 shows the state in which user A is selected.

In such a state, when a [reception restriction removal] key 41 at the lower right part of the list display screen 40, which displays as a list the reception-restricted users, is touched, the controller 210 causes the operation unit 260 to display a user cancellation confirmation screen 50 illustrated in FIG. 15. When a [back] key 42 on the left side of the [reception restriction removal] key 41 is touched, the controller 210 clears the list display screen 40 so that the display is returned to the display of the previous screen.

On the user cancellation confirmation screen 50 illustrated in FIG. 15, a [YES] key 51 and a [NO] key 52 are arranged together with a message requesting confirmation of the removal of the reception restriction for the selected user A. When the [YES] key 51 is touched, the controller 210 removes the reception restriction on user A. Then, the operation unit 260 is caused to display the list display screen 40, which displays as a list the reception-restricted users, as illustrated in FIG. 14. When the [NO] key 52 is touched, the controller 210 causes the operation unit 260 to display the list display screen 40, which displays as a list the reception-restricted users, as illustrated in FIG. 14, without removing the reception restriction related to user A. Described above are the examples of the operation screen to be displayed in removing the reception restriction.

Notification Related to Reception Restriction

Next, an example of a notification (see step S29 of FIG. 2 and step S41 of FIG. 3) that the reception restrictor 214 sends to the administrator and the predetermined user when malware is detected from the data will be described. FIGS. 16 to 19 are explanatory diagrams each showing an example of the notification that the reception restrictor 214 sends to the administrator and the predetermined user. FIG. 16 shows an example of the contents of notification to be made to the administrator by the reception restrictor 214 when malware is detected. The notification indicated in FIG. 16 is made when user A is specified from the user information included in the data, but the device has not been able to be specified from the device information. Further, it is assumed that the contents of the linkage table 232 at the time when malware was detected are as illustrated in FIG. 4. The devices linked to user A (i.e., Device 1 and Device 2) are obtained by referring to the linkage table 232. Further, the users linked to each of Device 1 and Device 2 are also obtained by referring to the linkage table 232. MFPxx stated in FIG. 16 is the name of the multifunction peripheral 200.

FIG. 17 shows an example of the notification sent to the specific user indicated in ID 2 and ID 6 of FIG. 10 by the reception restrictor 214. In the above example, the notification is sent to user A. FIG. 18 shows an example of the notification sent to the estimated users indicated in ID 4 of FIG. 10 by the reception restrictor 214. In the case of the above example, since the user is specified but the device is unable to be specified, the notification of FIG. 18 will not be sent. FIG. 18 shows an example of the notification sent by the reception restrictor 214 in the case where the user is unable to be specified but the device has been able to be specified. FIG. 19 shows an example of the notification sent to the secondary estimated users indicated in ID 7 of FIG. 10 by the reception restrictor 214. In the above example, the notification is sent to users B and C.

Embodiment 2

Figure 20:
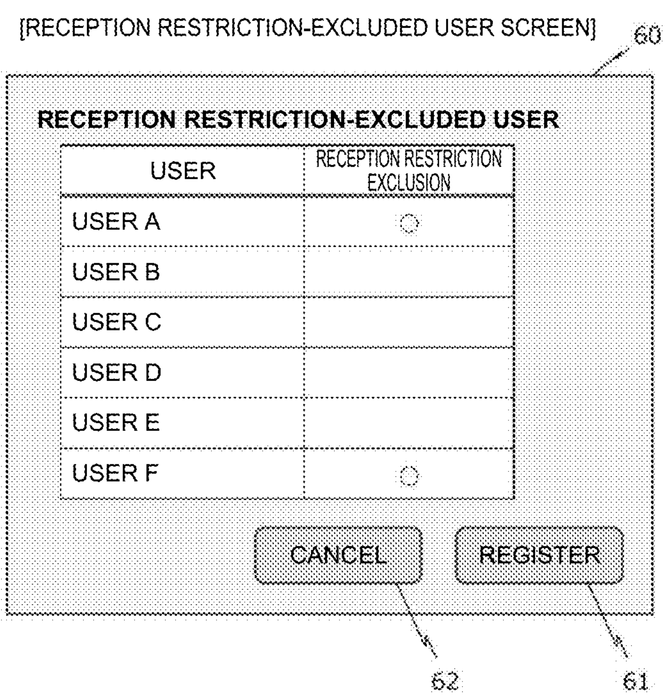
FIG. 20 is an explanatory diagram showing an example of an operation screen for receiving registration of a user who should be excluded from the target of reception restriction in the present disclosure.

When malware is detected from the received data, the reception restrictor 214 performs the reception restriction on the device and the user in accordance with a rule determined in advance as illustrated in FIG. 5 of the first embodiment. However, there may be a user, such as an administrator of the multifunction peripheral, for example, who may be troubled if he/she is included in the target of reception restriction. Therefore, the embodiment may be configured to allow a user who should be excluded from the reception restriction to be registered in advance. FIG. 20 is an explanatory diagram showing an example of an operation screen for receiving registration of a user who should be excluded from the target of reception restriction by a reception restrictor 214.

When an administrator performs a predetermined operation on an operation unit 260, it is assumed that a restriction-excluded user setting screen 60 illustrated in FIG. 20 is displayed on the operation unit 260 by the reception restrictor 214 that has recognized the operation. On the restriction-excluded user setting screen 60, a list of users stored in a linkage table 232 is displayed. The state of each of the users reflects the state stored in a nonvolatile storage area of a storage 230 determined in advance. When any one of the users is touched, the reception restrictor 214 sets the user to be in the state of a user excluded from the target of reception restriction. In FIG. 20, user A and user F with a sign of a circle (○) in the right column exhibit the state in which the user is excluded from the target of reception restriction. When the user in the registered state is touched again, the reception restrictor 214 makes a change so that the user is brought into the state of being the target of reception restriction, in other words, in a normal user state. When a [register] key 61 at the lower right part of the restriction-excluded user setting screen 60 is touched, the reception restrictor 214 confirms the state of each user displayed as a list on the restriction-excluded user setting screen 60. When a [cancel] key 62 on the left side is touched, the reception restrictor 214 clears the restriction-excluded user setting screen 60 so that the display is returned to the display of the previous screen.

Embodiment 3

In an environment in which the multifunction peripheral 200 is used by being connected to a network such as an intranet in a company, for example, when there is an image processing apparatus, such as a multifunction peripheral, other than the multifunction peripheral 200 on the network, the embodiment may be configured to allow a reception restrictor 214 to share information related to restriction of data reception with the other image processing apparatus so that the other image processing apparatus can also execute the same restriction and removal of the restriction. According to this mode, when there exists an other image processing apparatus connected via the network, restriction of the data reception can be performed in synchronization with each other. Accordingly, transmission and reception of data including malware can be more reliably restricted.

It should be interpreted that the present disclosure also includes a combination of any of a plurality of aspects described above. Various modifications of the present disclosure are possible in addition to the above-described embodiments. Such modifications should not be construed as falling outside the scope of the present disclosure. The present disclosure should embrace the claims and their equivalents, and all modifications belonging to the scope of the claims.

While there have been described what are at present considered to be certain embodiments of the invention, it will be understood that various modifications may be made thereto, and it is intended that the appended claims cover all such modifications as fall within the true spirit and scope of the invention.

What is claimed is:

1. An image processing apparatus comprising:
- a data receiver that receives, from outside, data including at least one of user information or device information;
- a storage that stores the received data; and
- at least one controller that:
  - detects whether the received data includes malware, and
  - restricts, on or after the detection of the malware from the received data, reception of at least specific data from the outside, wherein:
- the specific data is:
  - data related to a user in a case that the user is specifiable based on the user information, or
  - data provided from a device in a case that the device that has provided the data is specifiable based on the device information,
- the storage further includes a linkage table which stores the user information included in the received data and estimated device information in a manner to be linked to each other in advance, the estimated device information corresponding to the user information and related to the device that is a providing source of the data,
- the linkage table further links the estimated device information and estimated user information indicating an estimated user corresponding to an estimated device specified with the estimated device information, and
- when the user is specifiable due to the user information being included in the received data in which the malware has been detected, and the device that is the providing source of the data is unspecifiable, the at least one controller:
  - refers to the linkage table, specifies the estimated device based on the estimated device information linked to the user information,
  - specifies the estimated user based on the estimated user information linked to the estimated device information, and
  - restricts reception of each of the data related to the user, data provided from the estimated device, and data related to the estimated user.

2. The image processing apparatus according to claim 1, wherein the at least one controller further receives a setting of the linkage table by a second user.

3. The image processing apparatus according to claim 1, wherein the at least one controller further makes an addition and an update of a relationship between the estimated user information and the estimated device information to the linkage table based on the user information and the device information included in the data received from the outside.

4. The image processing apparatus according to claim 1, wherein the at least one controller further executes different modes of restriction or restriction removal in a case in which the reception of the data related to the user specified, based on the user information included in the received data, is restricted, and in a case in which the data reception related to the estimated user with reference to the linkage table is restricted.

5. The image processing apparatus according to claim 1, wherein, when the malware is detected from the received data and the data reception from the outside is to be restricted, the at least one controller sends, to an address based on a rule determined in advance, a notification indicating that the data reception is restricted.

6. The image processing apparatus according to claim 1, wherein the at least one controller shares information related to the reception restriction with another image processing apparatus connected to a network, such that the other image processing apparatus is also enabled to execute similar restriction and removal of restriction in a case that:
- the received data is received via the network,
- the other image processing apparatus is communicably connected to the network, and
- the malware is detected and the data reception is to be restricted.

7. An image processing apparatus comprising:
- a data receiver that receives, from outside, data including at least one of user information or device information;
- a storage that stores the received data; and
- at least one controller that:
  - detects whether the received data includes malware, and
  - restricts, on or after the detection of the malware from the received data, reception of at least specific data from the outside, wherein:
- the specific data is:
  - data related to a user in a case that the user is specifiable based on the user information, or
  - data provided from a device in a case that the device that has provided the data is specifiable based on the device information,
- the storage further includes a linkage table which stores the device information included in the received data and estimated user information in a manner to be linked to each other in advance, the estimated user information corresponding to the device information and indicating the user related to the data,
- the linkage table further links the estimated user information and estimated device information indicating an estimated device corresponding to an estimated user specified with the estimated user information, and
- when the device that is a providing source of the data is specifiable due to the device information being included in the received data in which the malware has been detected, and the user related to the data is unspecifiable, the at least one controller:

refers to the linkage table, specifies the estimated user based on the estimated user information linked to the device information, specifies the estimated device based on the estimated device information linked to the estimated user information, and restricts reception of each of the data provided from the device, data related to the estimated user, and data provided from the estimated device.

8. The image processing apparatus according to claim 7, wherein the at least one controller further executes different modes of restriction or restriction removal in a case in which the data reception from the device specified based on the device information included in the received data is restricted, and in a case in which the data reception from the estimated device with reference to the linkage table is restricted.

9. A malware checking method, which is performed by a controller of an image processing apparatus, the malware checking method comprising:

receiving, from outside, data including at least one of user information or device information;

detecting whether the received data includes malware; and restricting, on or after the detection of the malware from the received data, reception of at least specific data from the outside, wherein:

the specific data is:

data related to a user in a case that the user is specifiable based on the user information, or data provided from a device in a case that the device that has provided the data is specifiable based on the device information, and during restricting the reception of the specific data from the outside, when the user is specifiable due to the user information being included in the received data in which the malware has been detected, and the device that is a providing source of the data is unspecifiable, the malware checking method further comprises:

linking the user information included in the data and estimated device information with each other in advance, the estimated device information corresponding to the user information and related to the device that is the providing source of the data;

referring to a linkage table which further links the estimated device information and estimated user information indicating an estimated user corresponding to an estimated device specified with the estimated device information;

specifying the estimated device based on the estimated device information linked to the user information;

specifying the estimated user based on the estimated user information linked to the estimated device information; and restricting reception of each of the data related to the user, data provided from the estimated device, and data related to the estimated user.

* * * * *